UNITED STATES PATENT OFFICE.

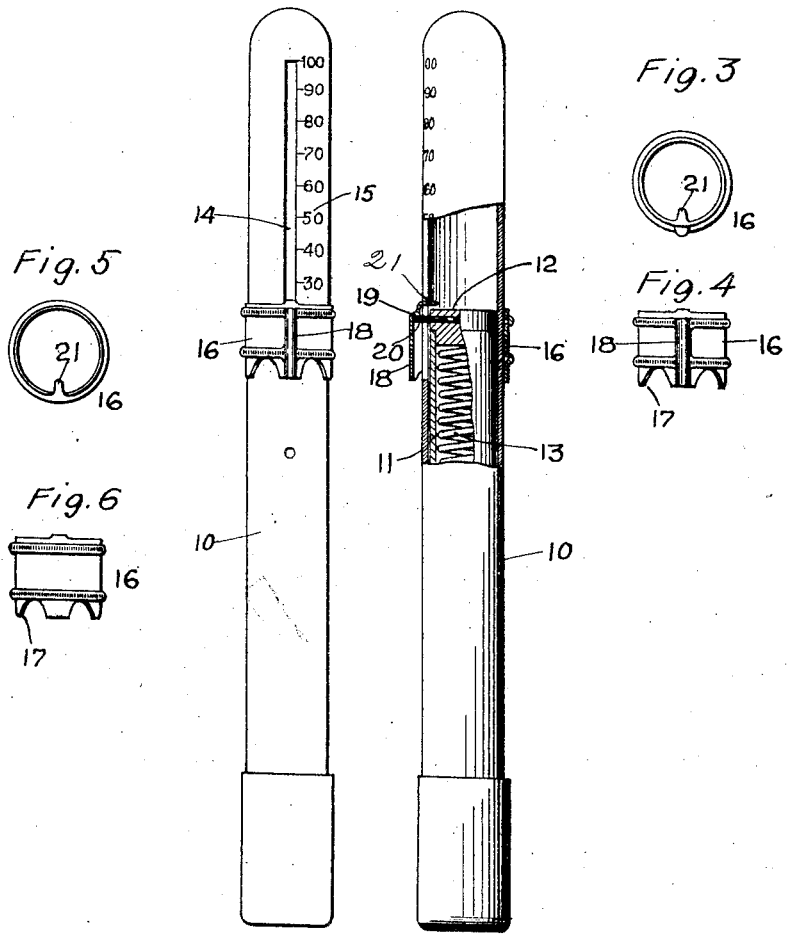

ANKER S. LYHNE, OF BRIDGEPORT, CONNECTICUT, ASSIGNOR TO WILLIAM A. ALLEN, OF YONKERS, NEW YORK.

RECORDING PRESSURE-INDICATOR.

994,701.  Specification of Letters Patent.  Patented June 6, 1911.

Application filed September 19, 1910. Serial No. 582,758.

*To all whom it may concern:*

Be it known that I, ANKER S. LYHNE, a citizen of the United States, residing at Bridgeport, county of Fairfield, State of Connecticut, have invented an Improvement in Recording Pressure-Indicators, of which the following is a specification.

This invention relates to pressure indicators adapted for general use and especially adapted for use in measuring the pressure in automobile tires. It is of course well understood that in using this class of indicators, when the dust cap is removed from the filling nipple upon the tire and the indicator placed over it, the pressure is transmitted to the indicator mechanism and the pressure within the tire is indicated by a scale upon the indicator, varying means having been provided for noting the pressure in connection with the scale.

My present invention causes the indicator to record the pressure so that the indicator may be applied to a tire where it would be too dark or impossible for any reason to read the scale, and the pressure within the tire will be recorded by the indicator which may then be removed and the pressure indication read whenever and wherever it is convenient to read it.

With this and other objects in view I have devised the novel recording pressure indicator which I will now describe, referring to the accompanying drawing forming a part of this specification and using reference characters to indicate the several parts:

Figure 1 is an elevation of my novel indicator as in use; Fig. 2 an elevation partly in longitudinal section from a point of view at right angles to the point of view in Fig. 1; Fig. 3 a plan view and Fig. 4 an elevation of the sleeve detached; and Figs. 5 and 6 are respectively a plan view and elevation of a variant form of sleeve detached.

10 denotes the case of the indicator which is tubular and is provided with a longitudinally movable inner tube 11, the upper end of which is closed by a plug 12, and which is normally retained in the retracted position by means of a pulling spring 13 which is attached to the cap. As my present invention is applicable to all indicators of this type and as the special construction of the indicator itself is wholly immaterial so far as the present invention is concerned, it is considered unnecessary to describe the indicator in detail. The case of the indicator is provided with a slot 14 by the side of which is a pressure indicating scale indicated by 15.

16 denotes a sleeve which is adapted to slide upon the case and is preferably provided at its lower end with spring arms 17, the action of which is to retain the sleeve at any position in which it may be placed and which, furthermore, enables the assembler in setting up indicators to compensate for variations in the tension of the springs by bending the spring arms and causing them to press more or less tightly upon the case. In this way the assembler is enabled to test each indicator and by regulating the pressure of the spring arms on the case to cause it to record pressure with practical accuracy. In the preferred form of the invention as in Figs. 1 to 4 inclusive, the sleeve is provided with a longitudinal housing 18 which is open at the lower end and is provided at its upper end with a shoulder 19 which is engaged by a pin 20 which is securely anchored in the plug, extends through the slot and projects far enough to engage the shoulder.

21 denotes a lip or lug which extends inward from the sleeve and engages the slot to retain the sleeve against other than longitudinal movement. In the present instance I have shown this lug as formed integral with the sleeve; that is, a lip of the metal of the sleeve is turned inward and engages the slot.

If preferred, the housing and shoulder may be dispensed with as in Figs. 5 and 6 and the pin may be caused to engage the lip which then serves the double purpose of retaining the sleeve against other than longitudinal movement and also as a point of engagement for a pin projecting from the plug.

The operation is as follows: The dust cap is removed from a tire nipple and the indicator placed over it in the usual way, so that the air pressure within the tire is transmitted to the inner tube and plug which is raised against the power of the spring carrying the sleeve with it. The upper edge of the sleeve co-acts with the scale and indicates the pressure. When the indicator is removed from the nipple the spring will instantly return the inner tube and plug to their normal position but the sleeve will remain in the position to which it has been carried by the pressure in the tire and the indication of the sleeve upon the scale can be read at the convenience of the operator.

My invention relates to the details of the construction of the sleeve 16 and I make no claim to having invented the other features of the gage, nor do I claim to be the inventor of the broad idea of applying to a tire pressure gage an indicator moving outward with the piston and remaining in indicating position while the piston returns to its normal position.

Having thus described my invention I claim:

1. A device of the character described comprising a slotted case having a scale, a sliding sleeve upon the case, spring arms upon the sleeve, for the purpose set forth, and a pressure-actuated plug within the case which engages the sleeve.

2. A device of the character described, comprising a slotted case having a scale, a sliding sleeve co-acting therewith and having a housing open at its lower end and provided with a shoulder and a pressure-actuated plug having a pin extending through the slot and engaging the shoulder.

3. A gage comprising a casing with a scale thereon, a sleeve sliding on said casing over said scale and inwardly directed spring lugs integral with said sleeve for frictionally engaging said casing, in combination with pressure actuated means for moving said sleeve upon said casing.

4. A gage comprising a casing with a scale thereon, a sleeve sliding on said casing over said scale and having one edge recessed to form spring lugs for frictionally engaging said casing, in combination with pressure actuated means for moving said sleeve upon said casing.

5. A gage comprising a slotted casing with a scale thereon, a sleeve sliding on said casing over said scale and having inwardly directed spring lugs integral therewith for frictionally engaging said casing and also a lug angled through the slot in said casing, in combination with pressure actuated means within said casing bearing upon said angled lug and serving to slide said sleeve over the said casing, substantially as described.

In testimony whereof I affix my signature in presence of two witnesses.

ANKER S. LYHNE.

Witnesses:
H. K. BEACH,
ISAAC L. FERRIS.